(12) United States Patent
Mathieu et al.

(10) Patent No.: US 10,731,748 B2
(45) Date of Patent: Aug. 4, 2020

(54) SPEED REDUCER WITH TWO INTERMEDIATE LINES FOR A TURBOPROP ENGINE, TURBOPROP ENGINE COMPRISING SAID REDUCER

(71) Applicant: SAFRAN TRANSMISSION SYSTEMS, Colombes (FR)

(72) Inventors: Antoine Mathieu, Courbevoie (FR); Benjamin Feraud, Coarraze (FR); Boris Pierre Marcel Morelli, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 106 days.

(21) Appl. No.: 15/780,418

(22) PCT Filed: Nov. 30, 2016

(86) PCT No.: PCT/FR2016/053140
§ 371 (c)(1),
(2) Date: May 31, 2018

(87) PCT Pub. No.: WO2017/093657
PCT Pub. Date: Jun. 8, 2017

(65) Prior Publication Data
US 2018/0347689 A1    Dec. 6, 2018

(30) Foreign Application Priority Data
Dec. 2, 2015 (FR) ...................................... 15 61733

(51) Int. Cl.
*F16H 57/12* (2006.01)
*F02C 7/36* (2006.01)
(Continued)

(52) U.S. Cl.
CPC .............. *F16H 57/12* (2013.01); *F02C 7/36* (2013.01); *F16C 23/08* (2013.01); *F16H 1/22* (2013.01);
(Continued)

(58) Field of Classification Search
CPC . F16H 1/06; F16H 1/22; F16H 57/021; F16H 57/022; F16H 57/12; F16H 57/126;
(Continued)

(56) References Cited

U.S. PATENT DOCUMENTS 1,327,026 A * 1/1920 Edward Dabbs Albert ................
F16C 27/04
384/581
1,351,321 A    8/1920 Alquist
(Continued)

FOREIGN PATENT DOCUMENTS

DE    198 52 394 A1    5/2000
FR    2 629 172 A1    9/1989
(Continued)

OTHER PUBLICATIONS

International Search Report as issued in International Patent Application No. PCT/FR2016/053140, dated Mar. 24, 2017.

*Primary Examiner* — Prasad V Gokhale
(74) *Attorney, Agent, or Firm* — Pillsbury Winthrop Shaw Pittman LLP

(57) ABSTRACT

A speed reducer includes two intermediate lines for a turboprop engine, the reducer including: an input line including an input shaft bearing an input gear wheel, a first intermediate line including a first intermediate shaft bearing a first intermediate gear wheel, a second intermediate line including a second intermediate shaft bearing a second intermediate gear wheel, a spring held by a frame, the spring surrounding a longitudinal portion of the input shaft in order (Continued)

to allow a movement of the input gear wheel towards an equilibrium position corresponding to an equal distribution of the transmission of the power coming from the input shaft to the first intermediate shaft of the first intermediate line and the second intermediate shaft of the second intermediate line.

11 Claims, 3 Drawing Sheets

(51) Int. Cl.
  *F16H 1/22* (2006.01)
  *F16H 57/021* (2012.01)
  *F16C 23/08* (2006.01)
  *F16H 57/022* (2012.01)
  *F02K 3/04* (2006.01)

(52) U.S. Cl.
  CPC ......... *F16H 57/021* (2013.01); *F16H 57/022* (2013.01); *F02K 3/04* (2013.01); *F05D 2220/325* (2013.01); *F05D 2260/4031* (2013.01); *F16H 2057/0222* (2013.01); *F16H 2057/126* (2013.01); *F16H 2057/127* (2013.01); *Y02T 50/671* (2013.01)

(58) Field of Classification Search
  CPC ........... F16H 57/127; F16H 2057/0216; F16H 2057/0221; F16H 2057/0222; B60B 35/16; B60B 35/18; F16C 23/08; F16C 27/04
  See application file for complete search history.

(56) References Cited

U.S. PATENT DOCUMENTS

| | | | | |
|---|---|---|---|---|
| 3,372,963 | A | * | 3/1968 | Harris Dwight E .... F16B 21/18 384/537 |
| 4,953,417 | A | * | 9/1990 | Baumgarten ............. F16H 1/22 74/409 |
| 8,512,199 | B2 | * | 8/2013 | Rosnnarin; Josiah .. F16H 57/12 475/331 |
| 10,443,697 | B2 | * | 10/2019 | Feraud .................... F01D 25/16 |
| 2006/0169528 | A1 | * | 8/2006 | Yuasa .................. B62D 5/0409 180/444 |
| 2007/0295136 | A1 | | 12/2007 | Fleming |
| 2009/0080823 | A1 | * | 3/2009 | Bauch .................. F16C 25/083 384/518 |
| 2009/0272358 | A1 | * | 11/2009 | Schober ................ F16F 15/264 123/192.2 |
| 2013/0313060 | A1 | * | 11/2013 | Takada .................. F16D 41/203 192/46 |
| 2016/0281609 | A1 | * | 9/2016 | Mitrovic ................. F02C 3/107 |
| 2017/0219049 | A1 | * | 8/2017 | Takano ..................... F16H 1/22 |
| 2018/0372197 | A1 | * | 12/2018 | Mathieu ................. F01D 25/16 |

FOREIGN PATENT DOCUMENTS

| | | |
|---|---|---|
| GB | 633 971 A | 12/1949 |
| WO | WO 03/086836 A2 | 10/2003 |

* cited by examiner

SPEED REDUCER WITH TWO INTERMEDIATE LINES FOR A TURBOPROP ENGINE, TURBOPROP ENGINE COMPRISING SAID REDUCER

CROSS-REFERENCE TO RELATED APPLICATIONS

This is the U.S. National Stage of PCT/FR2016/053140, filed Nov. 30, 2016, which in turn claims priority to French Application No. 1561733, filed Dec. 2, 2015, the entire contents of all applications are incorporated herein by reference in their entireties.

TECHNICAL FIELD OF THE INVENTION

The invention relates to the general field of aircraft. More specifically, it relates to a speed reducer with two intermediate lines for a turbine engine such as a turboprop engine.

TECHNOLOGICAL BACKGROUND OF THE INVENTION

A turboprop engine comprises an air input, compressors, a combustion chamber, a turbine, a propeller and a speed reducer. Placed between the turbine and the axis of the propeller, a speed reducer is used to reduce the speed of rotation of the propeller compared to the speed of rotation of the shaft of the turbine, said speed of rotation of the turbine being too fast to supply said propeller.

Numerous types of speed reducers exist, notably epicyclic gear train reducers, chain reducers, worm screw reducers, intermediate drive line reducers, etc.

In a turboprop engine, the use of a reducer with two intermediate lines is particularly interesting because such a reducer allows an important reduction in speed, in a confined space and with a controlled mass. A reducer with two intermediate lines 1 is schematically represented in FIG. 1. With reference to FIG. 1, the reducer 1 comprises:
- an input line 16 comprising an input gear wheel 10 driven by an input shaft $a_1$,
- a first intermediate line 17 comprising a first intermediate gear wheel 11 and a third intermediate gear wheel 13 driven by a first intermediate shaft $a_2$,
- a second intermediate line 18 comprising a second intermediate gear wheel 11 and a fourth intermediate gear wheel 14 driven by a second intermediate shaft $a_3$,
- an output line 19 comprising an output gear wheel 15 driven by an output shaft $a_4$.

When the reducer 1 is used in a turboprop engine, the output shaft $a_4$ of the output line 19 is the shaft of the propeller and the input shaft $a_1$ of the input line is the shaft of the turbine. Thus, the speed of rotation of the output shaft $a_4$ is reduced compared to the speed of rotation of the input shaft $a_1$. To do so, half of the power of the input shaft has to transit through each of the intermediate shafts $a_2$ and $a_3$ to finally be transmitted to the output shaft $a_4$. The transmission of power takes place by means of gear wheels meshed with each other.

However, such reducers are hyperstatic systems, that is to say that without particular arrangement it is possible that an intermediate line transmits the majority of the engine power, whereas the other intermediate line practically does not transmit any power. Indeed, it is difficult to guarantee optimal meshing of the gear wheels with each other and thereby equal distribution of the power of the input gear wheel 10 between the first intermediate gear wheel 11 and the second intermediate gear wheel 12 and, consequently, between the third intermediate gear wheel 13 and the fourth intermediate gear wheel 14. FIG. 2 represents a front view of the speed reducer with two intermediate lines 1 presented in FIG. 1. With reference to FIG. 2, even if the input gear wheel 10 is in contact with the first intermediate gear wheel 11 and the second intermediate gear wheel 12 at the level, respectively, of the points A and B, it is difficult to guarantee that there is no play present at the level of the points C and D. It should be noted that the points C and D correspond to the contact points, respectively, of the third intermediate gear wheel 13 with the output gear wheel 15 and the fourth intermediate gear wheel 14 with the output gear wheel 15.

Thus, a so-called "load distribution" or "torque distribution" system is necessary to ensure that half of the power transits via each of the intermediate lines 17 and 18.

For example, U.S. Pat. No. 1,351,321A describes a load distribution system by the addition of a degree of vertical freedom to an input gear wheel by means of a rectangular part that can slide vertically. Said degree of freedom allows said input gear wheel to position itself freely along a vertical axis and thereby to ensure good distribution of the torque between the intermediate transmission lines. The compression spring, positioned below the rectangular part, has the function of compensating the vertical force due to the weight of the gear wheel.

However, the problem of such a "load distribution" system is that the use of the rectangular part mounted on the compression spring is complex to produce and risks degrading the reliability of the speed reducer. Moreover, the system according to the prior art does not allow the input gear wheel to move in an optimal manner.

GENERAL DESCRIPTION OF THE INVENTION

The aim of the invention is to simplify and to improve the load distribution system between the two intermediate lines of the reducer.

According to a first aspect, the invention relates to a speed reducer with two intermediate lines for a turboprop engine, said reducer comprising:
- an input line comprising an input shaft driving an input gear wheel,
- a first intermediate line comprising a first intermediate shaft driving a first intermediate gear wheel,
- a second intermediate line comprising a second intermediate shaft driving a second intermediate gear wheel,
- a spring held by a frame,
- the spring surrounding a longitudinal portion of the input shaft in order to allow a movement of the input gear wheel towards an equilibrium position corresponding to an equal distribution of the transmission of the power coming from the input shaft to the first intermediate shaft of the first intermediate line and the second intermediate shaft of the second intermediate line.

The reducer according to the first aspect allows the aforementioned problems to be resolved.

Indeed, the reducer according to the invention is simpler to produce than the reducer according to the prior art because the rectangular part mounted on the compression spring is replaced by a single spring. The use of the spring thus makes it possible to reduce the number of parts while fulfilling the same function.

The presence of the spring surrounding a longitudinal portion of the input shaft allows the input gear wheel driven by the input shaft to move freely, both vertically and laterally. Indeed, the torque between the intermediate lines is more efficiently distributed when the input shaft driving the input gear wheel has a lateral degree of freedom. Thus, when the input gear wheel is free to move radially, said input gear wheel positions itself naturally in a position where the meshing forces of the first intermediate line and the meshing forces of the second intermediate line cancel each other out. In this equilibrium position the torques transmitted to the first and second intermediate lines are equal.

Apart from the characteristics that have been described in the previous paragraph, the speed reducer according to the first aspect of the invention may have one or more additional characteristics among the following, considered individually or according to all technically possible combinations thereof.

According to one non-limiting embodiment, the spring surrounding a longitudinal portion of the input shaft allows a movement of the input shaft along an axis substantially perpendicular to an axis of rotation of the input shaft.

According to one non-limiting embodiment, the holding of the spring by the frame is achieved by attachment of a first portion of said spring to the frame.

According to one non-limiting embodiment, the holding of the spring by the frame is achieved by insertion of said spring into a groove of the frame.

According to one non-limiting embodiment, a bearing comprising an inner ring and an outer ring is positioned between the input shaft and the spring.

According to one non-limiting embodiment, a second portion of the spring is attached to the outer ring of the bearing.

According to one non-limiting embodiment, the inner ring of the bearing is attached to the input shaft.

According to one non-limiting embodiment, the inner ring of the bearing is attached to the input shaft by shrink fitting.

According to one non-limiting embodiment, the spring is spiral.

According to one non-limiting embodiment, the frame is a casing of the reducer.

According to a second aspect, the invention relates to a turboprop engine comprising the speed reducer according to the first aspect of the invention.

The invention and its different applications will be better understood on reading the description that follows and by examining the figures that accompany it.

BRIEF DESCRIPTION OF THE FIGURES

The figures are only presented for indicative purposes and in no way limit the invention. The figures show.

DETAILED DESCRIPTION OF AT LEAST ONE EMBODIMENT OF THE INVENTION

Unless stated otherwise, a same element appearing in the different figures has a single reference.

The invention relates to a speed reducer 1 with two intermediate lines allowing optimal distribution of loads between said intermediate lines.

In a turboprop engine, placed between the turbine and the propeller, a speed reducer 1 is used to reduce the speed of rotation of the shaft of the propeller compared to the speed of rotation of the shaft of the turbine.

Figure 1:
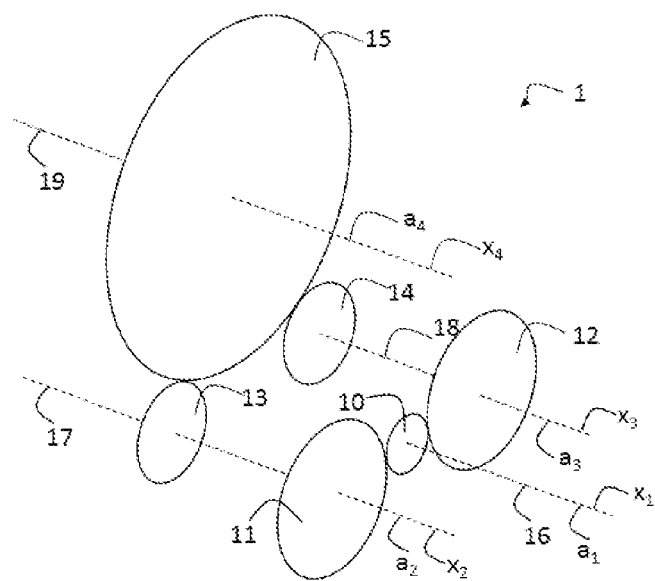
in FIG. 1, already described, a diagram of a speed reducer with two intermediate lines, seen in perspective, in FIG. 2, already described, a diagram of the speed reducer presented in FIG. 1, seen from the front, in FIG. 3, a diagram in axial section of an input line of the speed reducer according to one embodiment of the invention, in FIG. 4, a sectional view along the axis AA of the input line presented in FIG. 3, in FIG. 5, a diagram of the spring according to one embodiment when said spring undergoes a deformation.

With reference to FIG. 1, which schematically represents the principle of a speed reducer 1 with two intermediate lines, such a speed reducer 1 comprises:
  an input line 16,
  a first intermediate line 17,
  a second intermediate line 18,
  an output line 19.

The input line 16 includes an input shaft $a_1$ driving an input gear wheel 10, the input shaft $a_1$ corresponding to the shaft of the turbine of the turboprop engine (not represented). The input gear wheel 10 is meshed with a first intermediate gear wheel 11 and a second intermediate gear wheel 12 driven, respectively, by a first intermediate shaft $a_2$ and a second intermediate shaft $a_3$. The first intermediate gear wheel 11 mounted on the first intermediate shaft $a_2$ and the second intermediate gear wheel 11 mounted on the second intermediate shaft $a_3$ form, respectively, the first intermediate line 17 and the second intermediate line 18. The first intermediate line 16 comprises a third intermediate gear wheel 13 mounted on the first intermediate shaft $a_2$ and the second intermediate line 18 comprises a fourth intermediate gear wheel 14 mounted on the second intermediate shaft $a_3$. The output line 19 includes an output gear wheel 15 driven by an output shaft $a_1$, said output shaft $a_3$ corresponding to the shaft of the propeller of the turboprop engine (not represented). The output gear wheel 15 is meshed with the third intermediate gear wheel 13 and the fourth intermediate gear wheel 14.

It should be noted that the input line 16, the first intermediate line 17, the second intermediate line 18 and the output line 19 are parallel. Moreover, it should be noted that the input line 16 and the output line 19 are generally mounted in a casing 25 of the reducer 1.

Figure 2:
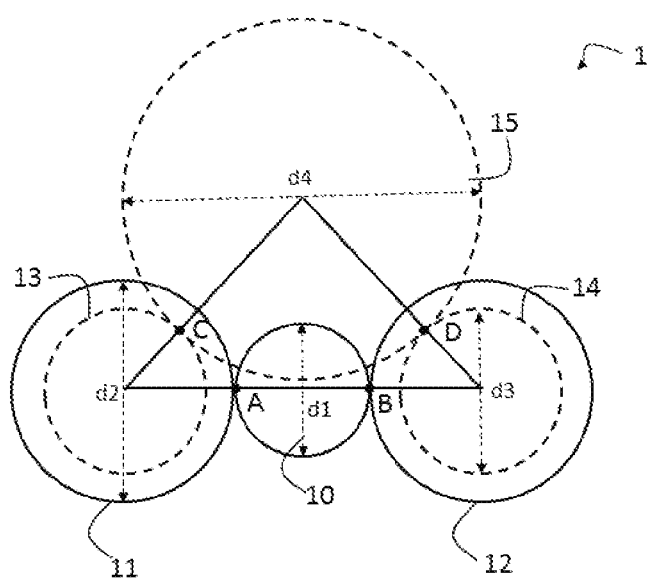

When the input gear wheel 10 is rotated along a first axis $x_1$ by means of the input shaft $a_1$, said input gear wheel 10, meshed with the first intermediate gear wheel 11 and the second intermediate gear wheel 12, drives the rotation of said intermediate gear wheels 11 and 12 along, respectively, a second axis $x_2$ and a third axis $x_3$. Indeed, the input line 16 transfers its power to the first intermediate line 17 and the second intermediate line 18. It should be noted that the first intermediate gear wheel 11 and the second intermediate gear wheel 12 have a smaller diameter d2 and a lower number of teeth respectively than the diameter d1 and the number of teeth of the input gear wheel 10. The rotation of the first intermediate shaft $a_2$ driven by the rotation of the first intermediate gear wheel 11 drives the rotation of the third intermediate gear wheel 13. In the same way, the rotation of the second intermediate shaft $a_3$, driven by the rotation of the second intermediate gear wheel 12, drives the rotation of the fourth intermediate gear wheel 14. It should be noted that according to the embodiment presented in FIG. 2, the third intermediate gear wheel 13 and the fourth intermediate gear wheel 14 have a smaller diameter d3 and a lower number of teeth, respectively, than the diameter d2 and the number of teeth of the first intermediate gear wheel 11 and of the second intermediate gear wheel 12. The meshing of the third intermediate gear wheel 13 and the fourth intermediate gear wheel 14 with the output gear wheel 15 drives the rotation of said output gear wheel 15 and thereby the rotation of the output shaft $a_4$ along a fourth axis of rotation $a_4$.

The diameter d4 of the output gear wheel 15 is greater than the diameter d3 of the third and fourth intermediate gear wheels 13 and 14. The use of toothed gear wheels of different diameters makes it possible to modify the speed of rotation of the output shaft $a_4$ compared to the speed of rotation of the input shaft $a_1$ so as to reduce the speed of the output shaft $a_4$ (the shaft of the propeller) compared to the input shaft $a_1$ (the shaft of the turbine).

Figure 3:
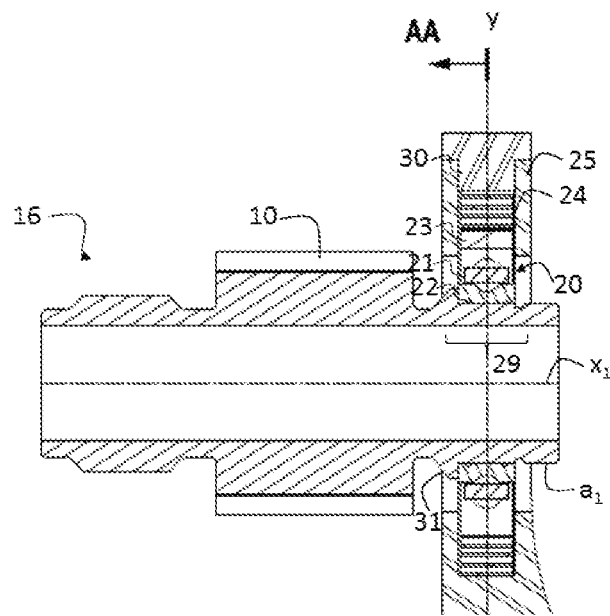
Figure 4:
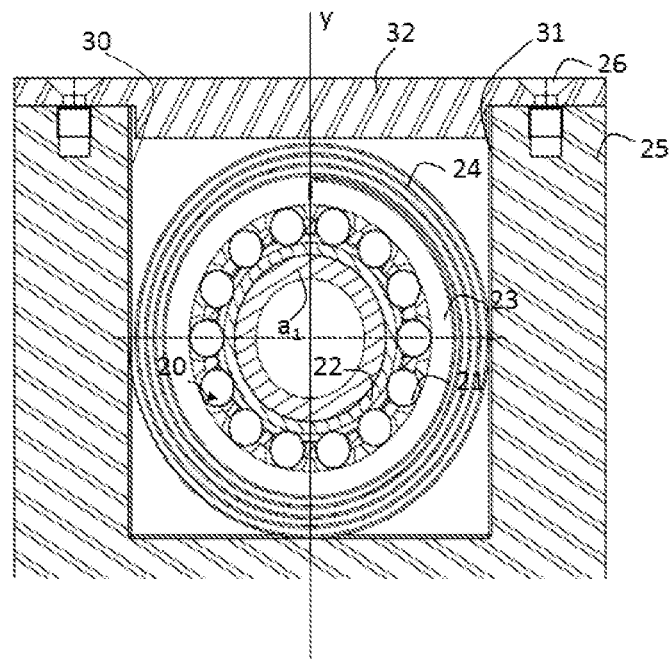

FIG. 3 represents an axial section of the input line 16 of said speed reducer 1 according to one embodiment of the invention. Indeed, the load distribution system is positioned at the level of the input line 18 of the reducer 1. With reference to FIG. 3, a longitudinal portion 29 of the input shaft $a_1$ is mounted in the casing 25 of the reducer 1 by means of an orifice 31 of said casing 25. According to the embodiment presented in FIGS. 3 and 4, the casing 25 has a groove 30 to receive said longitudinal portion 29 as well as a bearing 20 and a spring 24. Furthermore, according to one embodiment, one end of the input shaft $a_1$ (not represented in the figures) is held by a system allowing free rotation of the input shaft $a_1$. According to one embodiment, said system allowing free rotation of the input shaft $a_1$ is formed by swivelling splines.

As explained previously, the groove 30 of the casing 25 receives the longitudinal portion 29 of the input shaft $a_1$, said portion 29 being surrounded by the bearing 20 itself surrounded by the spring 24. The groove 30 is obstructed by means of a cover 32 attached to the walls of the groove 30 by attachment means 26.

The bearing 20 is composed of an outer ring 23 and an inner ring 22 between which are placed the balls 21. The inner ring 22 is attached around the longitudinal portion 29 of the input shaft $a_1$. According to one embodiment, the bearing 20 is attached to the input shaft $a_1$ by shrink fitting.

The spring 24 surrounds the outer ring 23 of the bearing 20. According to the embodiment presented in FIG. 5, the spring 24 is spiral. According to one embodiment, a first end 27 (visible in FIG. 5) of the spring 24 is attached to the outer ring 23 of the bearing 20. Furthermore, according to one embodiment, a second end 28 (visible in FIG. 5) is attached to the casing 25 of the reducer 1. According to another embodiment, a first part is attached to the casing 25 and a second part to the outer ring 23. "Part" of the spring 24 is taken to mean a portion of the spring 24 with the exception of the first end 27 and the second end 28 of said spring 24.

Moreover, according to one embodiment, the spring 24 has a torsional stiffness making it possible to block the rotation of the outer ring 23 of the bearing 20. According to one embodiment, the torsional stiffness of the spring 24 is high compared to the radial stiffness of said spring 24 to allow the radial movement of the input gear wheel 10. Low radial stiffness of the spring 24 allows the input gear wheel 10 to position itself freely and thereby to ensure good distribution of torque between the intermediate lines 17 and 18. It should be noted that the torsional stiffness and the radial stiffness of the spring 24 can vary depending on the application.

Thus, when the input gear wheel 10 adopts an incorrect positioning leading to incorrect transmission of the power of the input line 16 between the first intermediate line 17 and the second intermediate line 18, said input gear wheel 10 is going to move naturally to take up an equilibrium position again allowing an equal distribution of the power between the intermediate lines 17 and 18. It should be noted that an incorrect transmission of the power of the input line 16 to the intermediate lines 17 and 18 leads to one intermediate line being more loaded than the other. The torque transiting via the most loaded intermediate line is then greater than on the other intermediate line, thus the force brought about by said torque on the input gear wheel 10 is greater on one side than the other.

The presence of the spring 24 surrounding a longitudinal portion 29 of the input shaft $a_1$ allows the input gear wheel 10 to move freely both vertically and laterally. When the input gear wheel 10 moves to adopt an equilibrium position, the spring 24, attached to the casing 25 and to the outer ring 23 of the bearing 20, is deformed. It should be noted that the torque between the intermediate lines 17 and 18 is more efficiently distributed when the input shaft $a_1$ driving the input gear wheel 10 has a lateral degree of freedom in addition of a vertical degree of freedom. Indeed, when the input gear wheel 10 is free to move radially, said input gear wheel 10 positions itself naturally in a position where the meshing forces of the first intermediate line 17 and the meshing forces of the second intermediate line 18 cancel each other out. In this equilibrium position the torques transmitted to the first and second intermediate lines 17 and 18 are equal.

Figure 5:
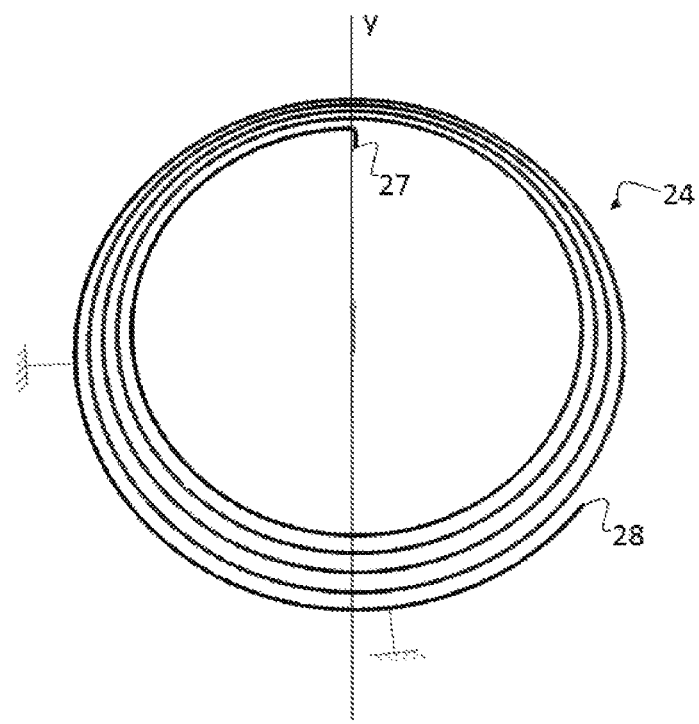

FIG. 5 represents an example of deformation of the spring 24 when the input shaft $a_1$ and, consequently, the input gear wheel 10 adopt an incorrect positioning. With reference to FIG. 5, the spring 24 is deformed vertically (along the y axis represented in FIG. 4): compressed on a part of the spring 24 and drawn out at the level of another part of the spring 24, that is to say that the input shaft $a_1$ (not represented), and thus the input gear wheel 10, has moved vertically (along the y axis). It should be noted that the deformation of the spring 24 may also be realised along directions other than vertical, the spring 24 allowing a movement of the input shaft $a_1$ along any axis substantially perpendicular to the axis of rotation $x_1$ of the input shaft $a_1$.

At equilibrium, the forces on the input gear wheel 10 due to the torques on the intermediate lines 17 and 18 cancel each other out, which means that the torques on said intermediate lines 17 and 18 are equal.

The invention claimed is:

1. A speed reducer with two intermediate lines for a turboprop engine, said speed reducer comprising:
    an input line comprising an input shaft for driving an input gear wheel,
    a first intermediate line comprising a first intermediate shaft and a first intermediate gear wheel mounted on the first intermediate shaft,
    a second intermediate line comprising a second intermediate shaft and a second intermediate gear wheel mounted on the second intermediate shaft, and
    a spring held by a frame,
    wherein the spring surrounds a longitudinal portion of the input shaft in order to allow a movement of the input gear wheel towards an equilibrium position corresponding to an equal distribution of a transmission of power coming from the input shaft to the first intermediate shaft of the first intermediate line and the second intermediate shaft of the second intermediate line.

2. The speed reducer according to claim 1, wherein the spring surrounding the longitudinal portion of the input shaft allows a movement of the input shaft along an axis substantially perpendicular to an axis of rotation of the input shaft.

3. The speed reducer according to claim 1, further comprising a bearing comprising an inner ring and an outer ring positioned between the input shaft and the spring.

4. The speed reducer according to claim 3, wherein a first end of the spring is attached to the outer ring of the bearing.

5. The speed reducer according to claim 3, wherein the inner ring of the bearing is attached to the input shaft.

6. The speed reducer according to claim 5, wherein the inner ring of the bearing is attached to the input shaft by shrink fitting.

7. The speed reducer according to claim 1, wherein the spring is spiral.

8. The speed reducer according to claim 1, wherein a holding of the spring by the frame is achieved by attachment of a second end of said spring to the frame.

9. The speed reducer according to claim 1, wherein a holding of the spring by the frame is achieved by insertion of said spring into a groove of the frame.

10. The speed reducer according to claim 1, the frame is a casing of the reducer.

11. A turboprop engine characterised comprising the speed reducer with intermediate lines according to claim 1.

* * * * *